US006746734B2

(12) United States Patent
Tarullo

(10) Patent No.: US 6,746,734 B2
(45) Date of Patent: Jun. 8, 2004

(54) SURFACE COVERING SYSTEM

(76) Inventor: Daniel J. Tarullo, P.O. BOX 134, Voorheesville, NY (US) 12186

( * ) Notice: Subject to any disclaimer, the term of this patent is extended or adjusted under 35 U.S.C. 154(b) by 365 days.

(21) Appl. No.: 09/834,676

(22) Filed: Apr. 13, 2001

(65) Prior Publication Data

US 2002/0150702 A1 Oct. 17, 2002

(51) Int. Cl.[7] .......................... B65D 1/00; B65D 85/66; B65D 77/00; D03D 27/00; B32B 3/16

(52) U.S. Cl. .......................... 428/34.1; 428/47; 428/48; 428/40.3; 428/41.8; 428/42.2; 428/42.3; 428/95; 206/409; 206/811; 206/824

(58) Field of Search .......................... 428/34.1, 47, 48, 428/40.3, 41.8, 42.2, 42.3, 95; 206/409, 411, 824

(56) References Cited

U.S. PATENT DOCUMENTS

| | | | | | |
|---|---|---|---|---|---|
| 3,847,647 | A | | 11/1974 | Bahlo | 117/38 |
| 4,242,389 | A | | 12/1980 | Howell | 428/40 |
| 4,380,563 | A | | 4/1983 | Ayotte | 428/40 |
| 4,617,210 | A | | 10/1986 | Zybko | 428/35 |
| 4,680,209 | A | | 7/1987 | Zybko et al. | 428/35 |
| 4,849,267 | A | | 7/1989 | Ward et al. | 428/41 |
| 4,993,586 | A | * | 2/1991 | Taulbee et al. | 221/25 |
| 5,683,780 | A | | 11/1997 | Rodger et al. | 428/95 |
| 5,728,741 | A | | 3/1998 | Zegler et al. | 521/40 |
| 5,830,550 | A | * | 11/1998 | Treleaven et al. | 428/40.1 |
| 5,855,981 | A | | 1/1999 | Zegler et al. | 428/95 |
| 5,914,343 | A | | 6/1999 | Tang | 514/398 |
| 5,948,500 | A | | 9/1999 | Higgins | 428/95 |
| 5,950,959 | A | * | 9/1999 | Milliorn | 242/588.3 |
| 6,082,662 | A | * | 7/2000 | Gallien | 242/588.6 |
| 6,090,461 | A | * | 7/2000 | Frank et al. | 428/40.1 |
| 6,177,163 | B1 | * | 1/2001 | Blok et al. | 428/40.1 |

* cited by examiner

*Primary Examiner*—Harold Pyon
*Assistant Examiner*—Chris Bruenjes
(74) *Attorney, Agent, or Firm*—Heslin Rothenberg Farley & Mesiti P.C.; Victor A. Cardona, Esq.

(57) ABSTRACT

The present invention provides a surface covering system including a first covering portion detachably connected to a backing and a second covering portion detachably connected to the backing, wherein the first covering portion and the second covering portion are spaced apart on the backing.

39 Claims, 6 Drawing Sheets

SURFACE COVERING SYSTEM

TECHNICAL FIELD

This invention relates generally to the construction field and more particularly to systems and methods for covering surfaces.

BACKGROUND

Surfaces, for example floors, are covered in a variety of ways and with various materials. For example, a common way of covering a floor involves rolling out portions of carpeting and anchoring the edges thereof to the floor. Another method of installing carpeting involves installing a plurality of carpet tiles. These carpet tiles may have glue applied to their undersides during their manufacture. The undersides of these carpet tiles and thus the glue may further be covered with a backing material to maintain the glue in a usable condition until the time arrives for their installation. The backing may then be removed for application of the tiles to the floor. Alternatively, carpet tiles may be shipped from a factory without such glue, and therefore glue must be applied to a surface and/or the tiles during the application or installation process. In either case, the application or installation of carpeting tiles requires a substantial amount of manual labor. This labor is necessary to apply the glue to a surface or in the case of pre-applied glue to remove a backing from each tile so it can be applied to a surface, and to install each individual tile.

Thus, there is a need for improved systems and methods for covering surfaces, particularly carpet tile systems, which decrease the amount of manual labor necessary to cover surfaces.

SUMMARY OF THE INVENTION

The present invention provides, in first aspect, a surface covering system including a first covering portion detachably connected to a backing and a second covering portion detachably connected to the backing, wherein the first covering portion and the second covering portion are spaced apart on the backing.

The present invention provides, in second aspect, a surface covering system including a first surface covering portion detachably connected to a first backing, a second surface covering portion detachably connected to a second backing, and a connector connected to the first backing and the second backing.

The present invention provides, in a third aspect, a method for covering a surface including detachably connecting a first covering portion and a second covering portion to a backing to cause the first covering portion and the second covering portion to be located spaced apart on the backing.

The present invention provides, in a fourth aspect, a carpet tile system including a plurality of carpet tiles detachably connected to a backing, wherein at least two of the plurality of carpet tiles are separated from one another on the backing.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

In accordance with the principles of the present invention, systems and methods for covering surfaces are provided.

Figure 1:
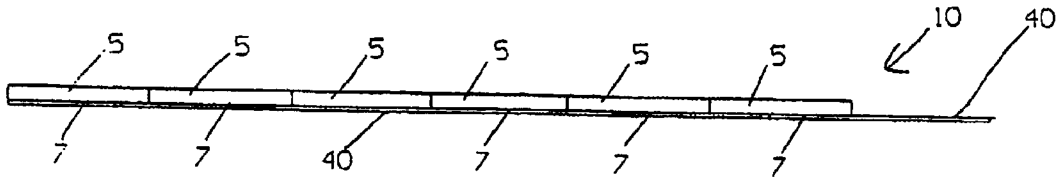
FIG. 1 is a side view of a plurality of surface covering portions connected to a backing.

FIG. 1 depicts a system 10 for covering surfaces which includes a plurality of carpet tiles or tiles 5 attached to a backing 40. Tiles 5 are detachably connected to a backing 40, for example, by a glue or an adhesive, such that they may be detached and applied to a floor. By attaching tiles 5 to backing 40, the adhesive or glue attached to bottom sides 7 of tiles 5 may be preserved. Specifically, they may remain in a condition amenable to being detached from backing 40 and applied securely to a floor. The adhesive might be, for example, a pressure sensitive adhesive adapted to hold tiles 5 to backing 40 and to hold tiles 5 securely to the floor. Backing 40 may be formed of a long continuous sheet of a material capable of maintaining the pre-applied glue in a condition for later use, for example, a plastic material. For example, tiles 5 might be applied to the floor securely such that the installation meets the Americans with Disabilities Act recommendations for securely attached carpet tile, as is known by those skilled in the art.

Materials for covering surfaces, for example carpeting, which are manufactured at different times may differ slightly, as is known by those skilled in the art. For example, tiles of carpeting from different manufacturing runs or dye lots may differ in color, thickness, or roughness. Thus, because the appearance of these tiles may vary by their period of manufacture, it is desirable to keep tiles together which are manufactured at the same time, i.e. those of the same dye lot.

Figure 2:
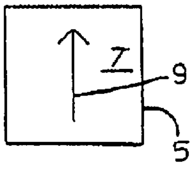
FIG. 2 is a bottom view of a surface covering portion of FIG. 1.

Therefore, attaching tiles 5 from a particular dye lot or manufacturing run to backing 40 allows one to reduce or prevent the mixing of tiles 5 which have different appearances. Further, the application of differing tiles to a single surface, which might create an undesirable appearance, may also be reduced or prevented. Also, correct installation of carpet tiles may require all tiles to be aligned in a particular direction. For example, carpet tiles 5 may include arrows 9 designating such direction on their bottom sides 7, as illustrated in FIG. 2. Thus, tiles 5 might be attached to backing 40 (FIG. 1) with arrows 9 facing a single direction and therefore might be removed therefrom with arrows 9 still facing the single direction, thus reducing or preventing a misalignment of tiles 5 during installation thereof.

Figure 3:
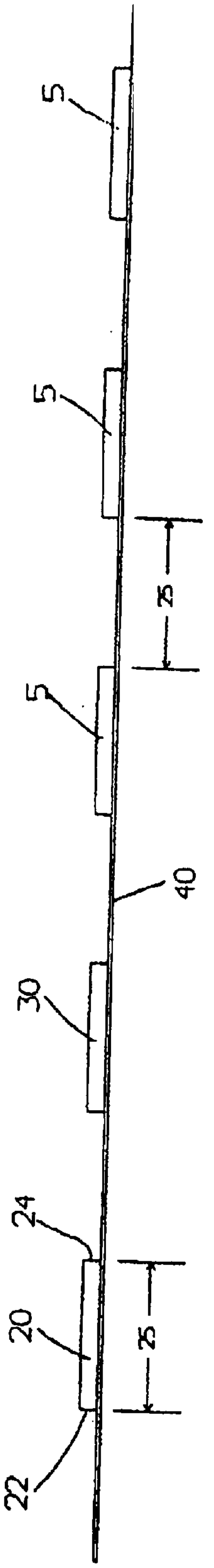
FIG. 3 is a side view of a first embodiment of a plurality of surface covering portions connected to a backing, in accordance with the present invention.

In another aspect, depicted in FIG. 3., tiles 5 are detachably connected, by a pressure sensitive floor adhesive, for example, to backing 40 and separated or spaced apart from one other. For example, a tile 20 and a tile 30 are attached to backing 40 spaced apart from one another on backing 40. Specifically, tile 20 is separated from tile 30 by a distance 25 about equal to a distance from one edge 22 of tile 20 to a second edge 24 or from one end of tile 30 to its other end. In such a case, a distance between each tile is about equal to a length or a width of the tile itself. For example, the tile might be 18 inches wide and 18 inches long and the distance between two tiles might also be 18 inches. As will be evident to those skilled in the art, tile 20 and tile 30 might be two of a plurality of tiles and backing portion 40 might be one of a plurality of backing portions.

Figure 4:
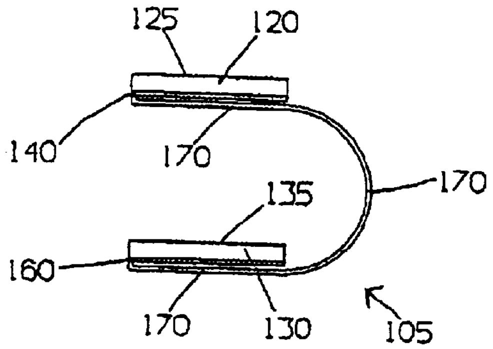
FIG. 4 is a side view of a second embodiment of a plurality of surface covering portions connected to a backing, in accordance with the present invention.

In another embodiment of a surface covering system 105 of the present invention, illustrated in FIG. 4, a tile 120 is detachably connected to a backing portion 140 and a tile 130 is detachably connected to a separate backing portion 160. Backing portion 140 is attached to backing portion 160 by a connector 170. Also, a top portion 125 of tile 120 and top portion 135 of tile 130 face a same direction and their top sides are about parallel to one another. As will be evident to those skilled in the art, tile 130 and tile 140 might two of a plurality of tiles and backing portion 140 and backing portion 160 might be two of a plurality of backing portions while connector 170 may be one of a plurality of connectors.

Figure 5:
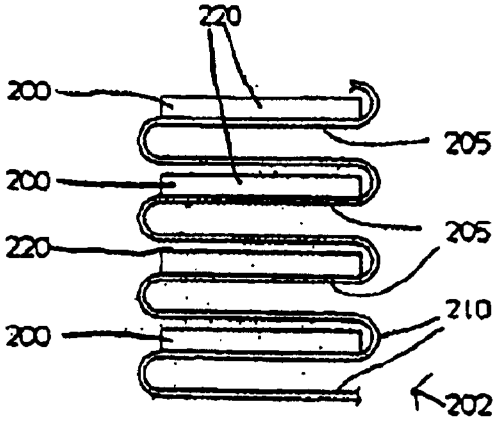
FIG. 5 is a side view of a third embodiment of a plurality of surface covering portions connected to a backing, in accordance with the present invention.
Figure 6:
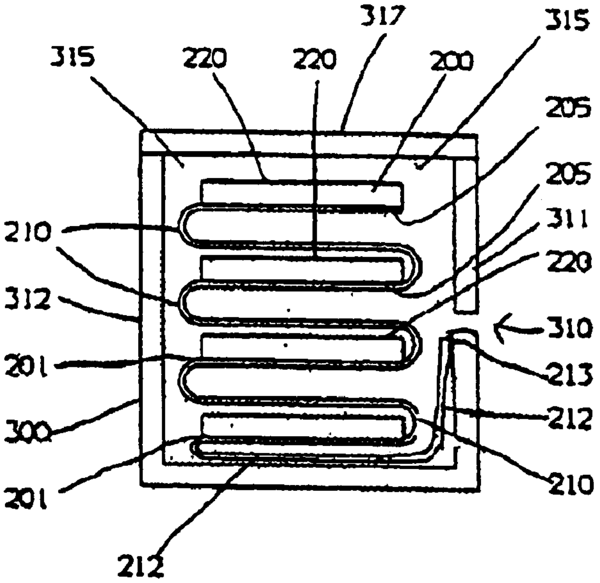
FIG. 6 is a side cross-sectional view of a container holding the surface covering portions of FIG. 5.

As illustrated in FIG. 5, in another embodiment of the present invention, a surface covering system 202 includes bottom sides 205 of a plurality of tiles 200 removably connected to a continuous backing 210 via a glue or adhesive, for example. Top portions 220 of tiles 200 approximately face a same direction and are approximately parallel to one another. A container 300 might hold tiles 200 attached to backing 210 and stacked atop one another, as illustrated in FIG. 6.

Container 300 is made of a material suitable for shipping and holding tiles, for example, cardboard, and includes an aperture or opening 310 sized to allow backing 210 to pass therethrough. For example, opening 310 may be about equal in width to backing 210 and may be sized to allow one or more layers of backing 210 to pass therethrough simultaneously. A user may pull backing 210 through opening 310 thus leaving bottom sides 205 of tiles 200 exposed to the ambient air and abutting top sides 220 of tiles 200. Tiles 200 with the glue or adhesive exposed are thus ready to be applied to a surface, for example a floor. Tiles 200, may then be removed from container 300 through a top opening 315, exposed on removal of a top 317, and applied to the surface.

Advantageously, backing 210 includes an extension potion 212 having an end 213 located adjacent to opening 310 via an adhesive or other attachment means to container 300 to facilitate the user's location of backing 210. Further, by pulling on end 213, removal of backing 210 from tiles 200 and container 300 may be optimized. This is due to the user pulling end 213 to cause the removal of backing 210 to start at ends 201 furthest from opening 310. This results in a "pealing" of backing 210 from each of tiles 200 starting at ends 201 due to the leverage provided by the user pulling extension 212 through opening 310, as will be evident to those skilled in the art. Thus, the removal of backing 210 from tiles 200 is facilitated. Alternatively, backing 210 may be removed through opening 310 by a mechanical puller (not shown) which might be coupled to and controlled by a processor (not shown).

Figure 7:
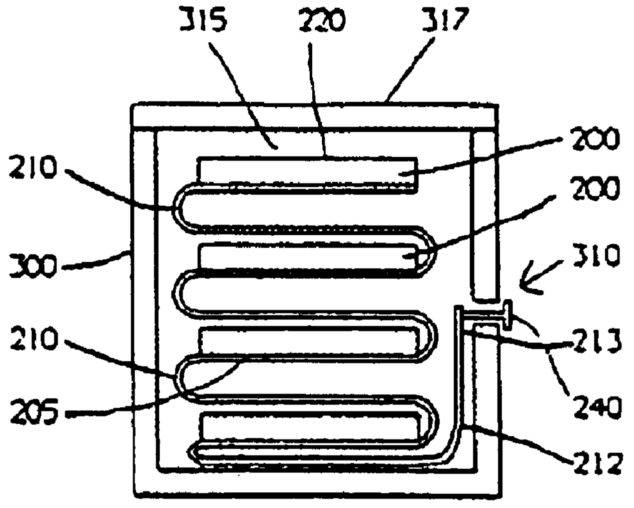
FIG. 7 is a side cross-sectional view of a fourth embodiment of a plurality of surface covering portions connected to a backing inside a container including a handle attached to the backing, in accordance with the present invention.

In another aspect, Backing 210 might also be attached to a handle 240 of container 300, as illustrated in FIG. 7. Handle 240 might be separate from container 300, or it might be integral thereto and/or detachable therefrom, for example by perforations (not shown) in a side of container 300. A user may thus remove handle 240 from container 300 and thereby remove backing 210 from tiles 200. The addition of handle 240 may allow the user to get a better grip (i.e. stronger hold) than by pulling backing 210 itself Tiles 200, with backing 210 removed and the glue exposed, may thus be removed from container 300 through top opening 315 after removing top 317. Tiles 200 may thus be applied to a surface, for example, a floor. Advantageously, handle 240 may be attached to an end 213 of extension portion 212 of backing 210 to facilitate removal of backing 210, as will be evident to those skilled in the art from the above description.

Figure 8:
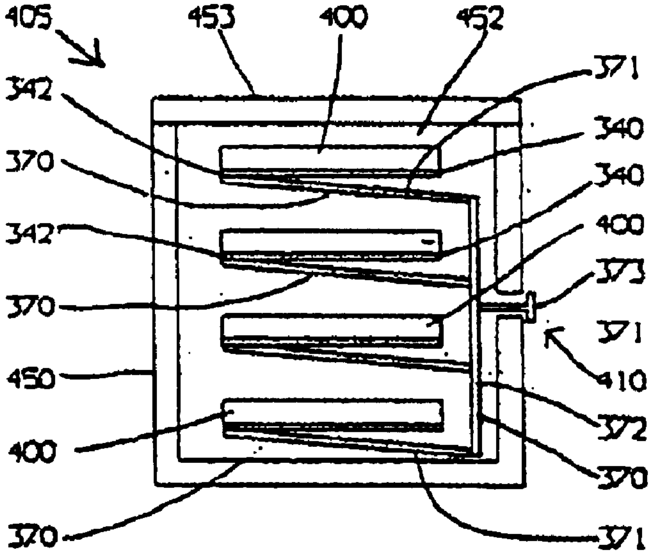
FIG. 8 is a side cross-sectional view of a fifth embodiment of a plurality of surface covering portions attached to a backing inside a container, in accordance with the present invention.

In another embodiment of a surface covering system 405, illustrated in FIG. 8, tiles 400 are detachably connected to backing portions 340, which are about the size of tiles 400. A connector 370 connects backing portions 340, for example, at ends 342 of tiles 400. Tiles 400 are stacked atop one another separated by backing portions 340 and connector 370 inside a container 450. Connector 370 may include one or more substantially lateral portions 371 and one or more substantially vertical portions 372. Connector 370 and backing portions 340 might be made of a same or different materials. For example, backing portions 340 might be made of a material capable of preserving carpet adhesive, while connector 370 might be made of a material which does not preserve such adhesive.

An opening 410 in container 450 is sized to allow connector 370 and backing portions 340 to be pulled therethrough. Since connector 370 is connected to backing portions 340, connector 370 and backing portions 340 may be removed from container 450 by pulling connector 370 through opening 410. Connector 370 might also be connected to a removable portion (not shown) of container 450 or a separate handle 373. In either case, a user may pull the removable portion or handle 373 to cause backing portions 340 and connector 370 to be removed from container 450. Tiles 400 may thus be removed from a top opening 452 of container 450, when a top 453 is opened, and applied to a surface, for example, a floor.

Figure 9:
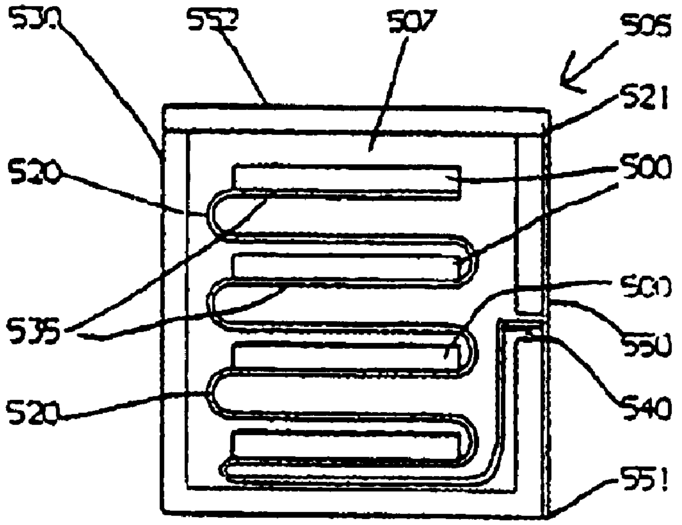
FIG. 9 is a side cross-sectional view of an sixth embodiment of a plurality of surface covering portions attached to a backing which is attached to a hingeable portion of a container enclosing the surface covering portions, in accordance with the present invention.

In yet another embodiment of a surface covering system 505 of the present invention, illustrated in FIG. 9, tiles 500 are detachably connected to a continuous backing 520 on undersides 535 of tiles 500 and are stored in a container 530.

Container 530 includes an opening 540 sized to allow backing 520 to be pulled therethrough. Container 530 includes a closing flap 550 attached on one end 521 to a top 552 of container 530 and attached on its inner face to backing 520 through opening 540. Closing flap 550 may be opened by a user to cause backing 520 to be completely or partially removed from tiles 500 and container 530 through opening 540. In a case of partial removal, the user may pull on backing 520 to complete removal of backing 520 from tiles 500 through opening 540. Closing flap 550 may be further opened to cause top 552 to open and expose an opening 507 of container 530. Tiles 500 may then be removed from container 530 and applied, adhered, or placed on a surface, for example, a floor. Flap 550 may be a hingeable, movable portion of container 530.

Figure 10:
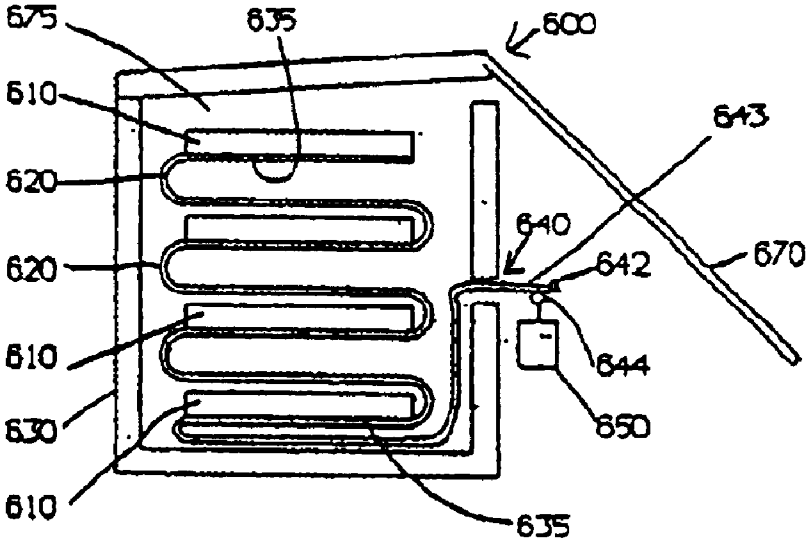
FIG. 10 is a side cross-sectional view of a seventh embodiment of a plurality of surface covering portions attached to a backing inside a container wherein the backing is attached to a spindle connected to a motor, in accordance with the present invention.

In a further embodiment of a surface covering system 600 of the present invention, illustrated in FIG. 10, tiles 610 are detachably connected to a continuous backing 620 on undersides 635 of tiles 610 and are stored in a container 630. Container 630 includes an opening 640 sized to allow backing 620 to be pulled therethrough. Container 630 may also include a flap 670 which may be lifted to expose opening 640 and may be further lifted to expose a top opening 675. Backing 620 may include a tab 642 on an end 643 of backing 620 which may extend through opening 640. Tab 642 may be detachably or fixedly connected to a spindle 644, for example via an adhesive, wherein spindle 644 is operatively connected to a motor 650. This arrangement allows backing 620 to be wound around spindle 644 by motor 650 thereby removing backing 620 from tiles 610 through opening 640. Tiles 610 may be removed through top opening 675 and applied to a surface, for example a floor. Motor 650 might also be coupled to and controlled by a processor (not shown).

It will be evident from the above description to one skilled in the art that the tiles of the present invention might be utilized to cover surfaces other than a floor, for example a wall, and may include surface covering portions other than carpeting tile, such as, wallpaper, floor tile, or other surface coverings which may be made in any shape or size, as is known by those skilled in the art. Also, the tiles may have their undersides partially or substantially covered with glue wherein the glue may be suitable to hold the tiles to a backing and to apply the tiles securely to a surface. The tiles may be "self-sticking" when applied to a surface, as it is known by those skilled in the art. The container also may hold any number of tiles and may be made in any number of shapes and sizes. One example of a suitable carpet tile is POWER BOND RS made by Collins & Aikman Floorcoverings, Inc, of Altman, Ga. Additionally, the backing may be removed from the tiles and from the container by any number of other ways, for example, by any number of mechanical devices which might be computer controlled.

Figure 11:
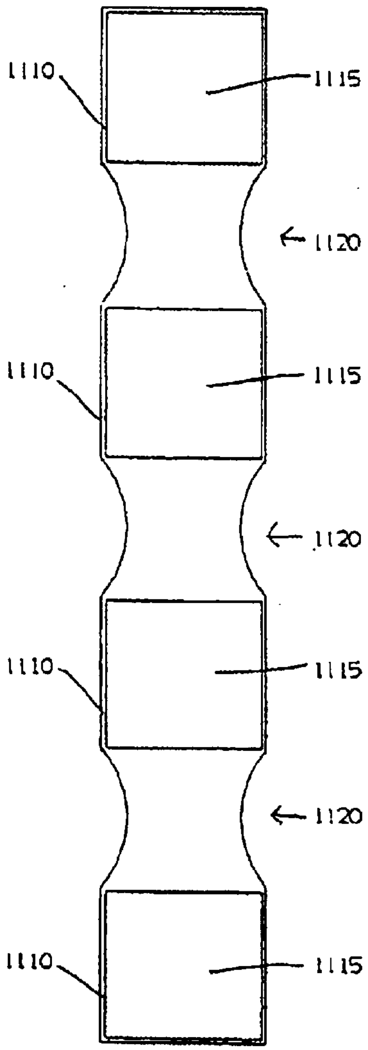
FIG. 11 is a top elevational view of a eighth embodiment of a plurality of surface covering portions attached to a backing, in accordance with the present invention.
Figure 12:
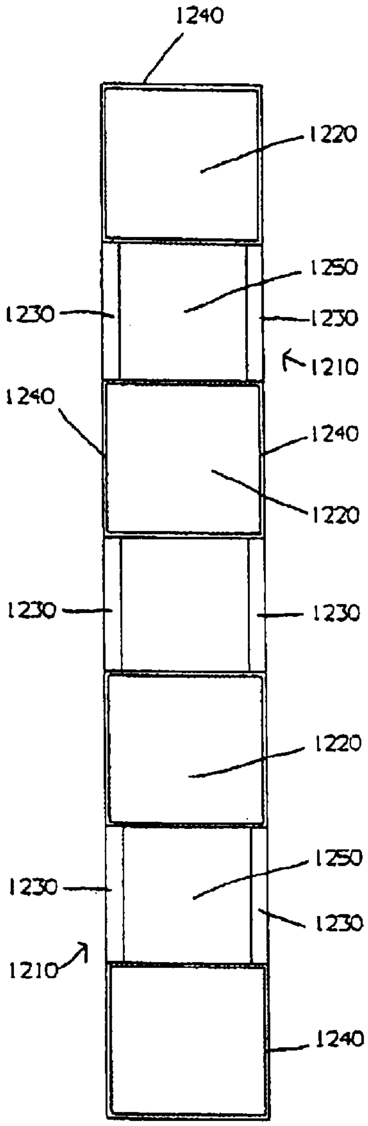
FIG. 12 is a top elevational view of the ninth embodiment of a plurality of surface covering portions attached to a backing, in accordance with the present invention.

From the above description, it will also be understood by those skilled in the art that the backing may be formed in a variety of shapes and sizes. For example, as depicted in FIG. 11, connecting backing portions 1120 located between tile backing portions 1110 may be equal in size or narrower than tile backing portions 1110 which are detachably connected to bottom sides (not shown) of tiles 1115. In another example, illustrated in FIG. 12, connecting backing portions 1210 located between tile backing portions 1240 include rectangular portions 1230 located at outside edges of tiles 1220 and open portions 1250 between rectangular portions 1230. These backings and tiles may be utilized in any number of containers having openings to facilitate removal of the backings therethrough. By utilizing backings of these shapes and sizes, less backing material might be used in forming connecting backing portions, as compared to backings of uniform dimension.

One example of a method for installing carpeting on a floor is described, as follows. Pressure sensitive carpeting adhesive is applied to bottom sides of a number of carpet tiles. The carpet tiles are then applied to a backing spaced apart from one another by a distance which allows one carpeting tile attached to backing 40 to be placed atop another carpeting tile attached to backing 40 about parallel to one another, as depicted in FIGS. 5 and 6. Tiles 200 might be placed at 18inch intervals from one another on backing 210, for example. Carpet tiles 200 are then placed in container 300, a carton, or a box stacked atop one another with their top and bottom faces about parallel to one another, as depicted in FIG. 6. Container 300 including the tiles might be stored or shipped to a location for installation of the tiles.

Prior to installation, for example, a few minutes to a few days before the tiles are to be installed, a user might reach through opening 310 in container 300 and pull backing 210 out therethrough. In an exemplary example, container 300 might be rotated such that a side 311 of container 300 is the top most side and a second side 312 is the bottom most side and advantageously is lying on a surface. Gravitational pressure on backing 210 resulting from the weight of tiles 200 may thereby be removed. Thus, backing 210 might more easily be removed from container 300 through opening 310. Tiles 200, having backing 210 removed, are thus in a condition to be installed on a floor. Manual removal of individual backings from bottom sides 205 of tiles 200 is thus reduced or avoided resulting in a saving of time otherwise necessary to remove each backing portion.

In another example of a method for installing carpeting tiles, referring to FIG. 7, backing 210 is attached to handle 240 through opening 310. As noted above, advantageously container 300 may be rotated such that handle 240 and opening 310 are located on a top side of container 300. With gravitational pressure on backing 210 reduced or eliminated, handle 240 may be pulled out of container 300 by the user resulting in backing 210 being removed from tiles 200. Top 317 may then be opened and tiles 200 may be removed from top opening 315 and applied to a surface, for example, a floor.

In a further example, referring to FIG. 8, a user may pull connector 370 and thus remove connecter 370 and backing portions 340 through opening 410 of container 450. Top 453 may then be opened and tiles 400 may be removed from top opening 452 and applied to a surface, for example a floor.

In yet another example of a method for installing carpet tiles, referring to FIG. 9, the user may pull a bottom end 551 of closing flap 550 connected to backing 520 upward to fully or partially pull backing 520 through opening 540 in container 530. In a case of partial removal, the user may directly pull on backing 520 to complete removal thereof from tiles 500. Tiles 500, having backing 520 removed therefrom, may then be removed from top opening 507 of container 530, when top 552 is opened, and tiles 500 may be applied to a surface, for example, a floor. Advantageously, container 520 may be rotated so closing flap 550 is located on a top side of container 530 prior to opening closing flap 550. Gravitational pressure thus may be relieved on backing 520 to facilitate removal of backing 520 from tiles 500.

In yet a further example of a method for installing carpet tiles, referring to FIG. 10, a user may locate motor 650 adjacent to container 630 after opening closing flap 670 to expose opening 640 and top opening 675. The user may removably or fixedly attach tab 642 of end 643 to spindle 644 via an adhesive preapplied to tab 642 and/or spindle 644, for example. Motor 650 may then be operated to wind backing 620 around spindle 644 and thereby remove backing 620 from tiles 610 and container 630. The user may then locate motor 650 adjacent to a different container, attach a different tab of a different backing to a spindle 644 or to backing 620 previously wound around spindle 644, and repeat the process. Tiles 610 may be removed from top opening 675 and applied to a surface, for example, a floor.

As will be evident to those skilled in the art from the above description, removing a continuous backing from tiles while the tiles are located in a container allows the tiles to be kept together in the container prior to their application to a floor or other surface. This is in contrast to removing each individual tile from the container to remove an individual backing therefrom. Also, since individual removal of separate backings from individual tiles is reduced or eliminated, a staging area at a work site to accomplish this task may be reduced or eliminated.

Further, since the backing is a continuous sheet, instead of a plurality of individual sheets, disposal of the backing is facilitated, because there is no need to account for each backing removed from each tile of the plurality of tiles.

Also, because removal of the backing is facilitated, the backing may be removed on a container by container basis. Thus, it is not necessary to remove the backing from a number of containers of tiles prior to beginning a particular installation job, but instead the backings may be removed as needed. Further, the backing may be removably attached to a subset of the tiles in a container thus allowing a subset of the container to be prepared for installation at a particular time. Therefore, there is less likelihood of backings being pre-removed from tiles in excess of an amount necessary to complete the particular job resulting in less waste and lower cost.

The above described methods might be used to apply any of various types of surface coverings to a surface, as will be evident to those skilled in the art from the above description. For example, wallpaper, floor tiles, or other floor coverings might be applied in a similar manner.

The examples is described herein are just examples. There may be many variations to the method and/or devices described herein without departing from the spirit of the invention. For instance, the operational steps may be performed in a different order, or steps may be added, deleted, or modified. All of these variations are considered a part of the claimed invention.

While parts of the description herein, for explanatory purposes, may imply certain exemplary directions, such directions may be considered relative. As will be appreciated by those skilled in the art, the significance of, for example, a "vertically upward" direction in many environments may stem from its opposition to a dominant "downwardly" acting gravitational force, resulting from the presence of a large mass such as the Earth, with "vertical" approximating radial alignment therewith. Furthermore, a "horizontal" direction and a "vertically upward" direction may be readily ascertained following determination of an appropriate "downward" direction. A number of design choices may allow accommodations of any orientations for any systems, carpet tiles, containers, backings, floor coverings, wallcoverings, and/or portions thereof Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A surface covering system, comprising:

a first covering portion detachably connected to a first backing portion of a backing;

a second covering portion detachably connected to a second backing portion of said backing; and wherein said first covering portion and said second covering portion are spaced apart on said backing and connected by a third backing portion of said backing and;

wherein said first covering portion is stacked on said second covering in a container such that said first covering portion is separated from said second covering portion by said first backing portion and said third backing portion.

2. The system of claim 1 wherein said first covering portion and said second covering portion are separated by at least a portion of said backing.

3. The system of claim 1 wherein said first covering portion comprises a first covering portion of a plurality of covering portions and said second covering portion comprises a second covering portion of said plurality of covering portions.

4. The system of claim 1 wherein said first covering portion comprises at least one of carpeting, wallpaper and floor covering, and said second covering portion comprises at least one of carpeting, wallpaper and floor covering.

5. The system of claim 1 wherein said first covering portion and said second covering portion comprise covering portions carpet tiles from a single dye lot.

6. The system of claim 1 wherein said first covering portion comprises a first proximate edge and a first distal edge, a first distance comprises a distance between said first proximate edge and said first distal edge, said second covering portion comprises a second proximate edge and a second distal edge, and a distance between said first distal edge and said second proximate edge comprises said first distance.

7. The system of claim 1 wherein said first covering portion and said second covering portion comprise bottom sides having glue applied thereto.

8. The system of claim 1 wherein said container further comprises an aperture for removing said backing therethrough.

9. The system of claim 8 further comprising a motor to remove said backing through said aperture.

10. The system of claim 9 further comprising a spindle operatively connected to said motor for winding said backing therearound.

11. The system of claim 10 wherein said backing comprises a tab for detachably connecting said backing to at least one of said spindle and a second backing wound around said spindle.

12. The system of claim 8 wherein a portion of said container is connected to a portion of said backing.

13. The system of claim 12 wherein said portion of said container is detachable from said container.

14. The system of claim 12 wherein said portion of said container is a hingably movable portion of said container.

15. The system of claim 8 further comprising a handle connected to said backing.

16. The system of claim 8 wherein said first covering portion comprises a first top side and said second covering portion comprises a second top side and first top side is located about parallel to said second top side inside said container.

17. The system of claim 16 wherein said first covering portion comprises a first bottom side and said first bottom side is separated from said second top side by said backing.

18. The system of claim 17 wherein said first covering portion comprises a first top side and said second covering portion comprises a second top side and wherein said first top side and said second top side face a first direction.

19. The system of claim 8 wherein said first covering portion comprises a first proximal end and a first distal end, said first proximal end being closer to said aperture than said first distal end, and wherein said second covering portion comprises a second proximal end and a second distal end, wherein said second proximal end is closer to said aperture than said second distal end, and wherein said third backing portion connects said first distal end and said second proximal end.

20. A surface covering system comprising:

a first covering portion detachably connected to a first backing, said first backing comprising a first proximal end and a first distal end;

a second covering portion detachably connected to a second backing said second backing comprising a second proximal end and a second distal end; and said first proximal end being aligned with said second proximal end and said first distal end being aligned with said second distal end when said second covering portion is stacked on said first covering portion; and a connector connected to said first distal end of said first backing and said second distal end of said backing.

21. The system of claim 20 wherein a first top side of said first backing comprises a surface area about equal to a first bottom side of said first covering portion, a second top side of said second backing comprises a surface area about equal to a second bottom side of said second covering portion, and said connector comprises a surface area different from at least one of said first top side and said second top side.

22. The system of claim 20 wherein a distance from a first edge of said first backing to a second edge of said first backing comprises a first dimension, a distance from a third edge of said second backing to a fourth edge of said second backing comprises a second dimension, a distance from a fifth edge of said connector to a sixth edge of said connector comprises a third dimension, and wherein said third dimension differs from at least one of said first dimension and said second dimension.

23. The system of claim 22 wherein said first dimension, said second dimension, and said third dimension comprise dimensions in a direction about perpendicular to an axis of connection between said first covering portion and said second covering portion.

24. The system of claim 20 wherein said first backing, said second backing and said connector comprise an integral backing.

25. The system of claim 20 further comprising a container to hold said first covering portion and said second covering portion.

26. The system of claim 25 wherein said connector further comprises a handle.

27. The system of claim 26 wherein said handle comprises a portion of said container.

28. The system of claim 27 wherein said portion of said container comprises a detachable portion of said container.

29. The system of claim 27 wherein said handle comprises a hingably openable portion of said container.

30. The system of claim 20 wherein said first covering portion and said second covering portion comprise carpet tiles.

31. The system of claim 20 wherein said first covering portion and said second covering portion comprise carpet tiles covering from a single dye lot.

32. The system of claim 20 further comprising a container enclosing said first covering portion and said second covering portion.

33. The system claim 32 wherein said container further comprises an aperture for removing said backing therethrough.

34. The system of claim 33 wherein said first proximal end and said second proximal end are closer to said aperture than said first distal end and said second distal end.

35. A carpet tile system comprising:

a plurality of carpet tiles detachably connected to a backing, wherein at least two of said plurality of carpet tiles are separated from one another on said backing; and wherein each carpet tile of said plurality of carpet tiles is separated from each adjacent carpet tile of said plurality of carpet tiles by two separate layers of said backing in response to said plurality of carpet tiles being stacked atop each other.

36. The carpet tile system of claim 35 further comprising a container to hold said plurality of carpet tiles.

37. The carpet tile system of claim 36 further comprising an opening in said container for pulling said backing therethrough.

38. A carpet tile system comprising:

a first carpet tile detachably connected to a first backing portion of a backing;

a second carpet tile detachably connected to a second backing portion of said backing;

a container, said second carpet tile stacked upon said first carpet tile in said container, said container having an aperture configured to allow said backing to pass therethrough;

wherein said first backing portion comprises a first proximal end and a first distal end, said first proximal end being closer to said aperture than said first distal end, and wherein said second backing portion comprises a second proximal end and a second distal end, wherein said second proximal end is closer to said aperture than said second distal end; and said backing comprising a third backing portion connecting said first proximal end and said second distal end.

39. The system of claim 38 wherein said aperture is located on a side of said container and further comprising a top opening configured to allow said first carpet tile and said second carpet tile to pass therethrough.

* * * * *